(12) United States Patent
Power et al.

(10) Patent No.: US 8,573,946 B2
(45) Date of Patent: Nov. 5, 2013

(54) COMPRESSOR BLADE

(75) Inventors: Bronwyn Power, Brownsburg, IN (US); Liping Xu, Cambridge (GB); Steven R Wellborn, Indianapolis, IN (US)

(73) Assignee: Rolls-Royce PLC, London (GB)

( * ) Notice: Subject to any disclaimer, the term of this patent is extended or adjusted under 35 U.S.C. 154(b) by 615 days.

(21) Appl. No.: 12/814,666

(22) Filed: Jun. 14, 2010

(65) Prior Publication Data
US 2010/0322777 A1 Dec. 23, 2010

(30) Foreign Application Priority Data
Jun. 22, 2009 (GB) .................................. 0910647.7

(51) Int. Cl.
*F01D 5/14* (2006.01)
(52) U.S. Cl.
USPC ........................................ 416/228; 416/231 B
(58) Field of Classification Search
USPC .... 416/223 R, 228, 231 R, 231 B, 232, 90 R, 416/91, 92, 93 R; 415/914, 915
See application file for complete search history.

(56) References Cited

U.S. PATENT DOCUMENTS

| | | | | |
|---|---|---|---|---|
| 5,480,284 A | * | 1/1996 | Wadia et al. | 416/91 |
| 5,904,470 A | * | 5/1999 | Kerrebrock et al. | 415/115 |
| 6,379,110 B1 | * | 4/2002 | McCormick et al. | 415/119 |

FOREIGN PATENT DOCUMENTS

| | | |
|---|---|---|
| EP | 2 014 871 A2 | 1/2009 |
| EP | 2 019 186 A1 | 1/2009 |
| GB | 1 482 933 | 8/1977 |
| GB | 2 418 471 A | 3/2006 |
| WO | WO 98/30802 A1 | 7/1998 |
| WO | WO 2007/106059 A2 | 9/2007 |

OTHER PUBLICATIONS

Carter A. D. S., Turner, R. C., Sparkes, D. W. and Burrows, R. A., 1960, "The Design and Testing of an Axial-Flow Compressor having Different Blade Profiles in Each Stage," Reports and Memoranda, Ministry of Aviation, Aeronautical Research Council, London, A.R. C. Technical Report No. 3183.*

British Search Report issued in Great Britain Patent Application No. 0910647.7 issued in Sep. 23, 2009.

* cited by examiner

*Primary Examiner* — Ninh H Nguyen
(74) *Attorney, Agent, or Firm* — Oliff & Berridge, PLC

(57) ABSTRACT

A blade for a compressor having a pressure surface and a suction surface. The suction surface includes a discontinuity in the chord-wise curvature of an intermediate portion of the suction surface between the blade leading edge and blade trailing edge, and a slot arranged along at least a portion of the blade in a substantially span-wise direction. The slot being disposed at or near the change in curvature, such that when in use lower momentum fluid near the suction surface is aspirated into the slot.

16 Claims, 2 Drawing Sheets

COMPRESSOR BLADE

The present invention relates to a blade for a compressor, and particularly, but not exclusively, relates to an aspirated blade for a compressor.

The application of flow control to axial-compressor blade/vane row design allows an increase in blade/vane loading levels and a broadened operating range. In particular, the increase in loading of blade/vane rows results in fewer blades/vanes and/or stages used for the same magnitude of flow turning and compressor pressure ratio respectively. The reduction in parts-count obtained yields a reduction in wetted area, reduced maintenance and reduced total weight of the compressor.

To this end, it is known to provide flow control with a slot on the suction surface of a compressor blade to delay flow separation, see for example WO2007/106059. However, such bleed slots remove mainstream flow, which affects the overall efficiency of a jet engine or gas turbine. (Generally speaking, the higher the pressure ratio the more efficient the engine, and if less of the mass-flow is experiencing this high pressure ratio, because it is being bled off, this will adversely affect the overall efficiency.)

The present invention therefore seeks to address this issue.

According to a first aspect of the present invention there is provided a blade for a compressor comprising a pressure surface and a suction surface, wherein the suction surface comprises: a discontinuity in the chord-wise curvature of an intermediate portion of the suction surface between the blade leading edge and blade trailing edge; and a slot arranged along at least a portion of the blade in a substantially span-wise direction, the slot being disposed at or near the said discontinuity in the curvature, such that when in use, lower momentum fluid near the suction surface is aspirated into the slot.

The blade thickness may increase monotonically from the leading edge to a point of maximum blade thickness. The blade thickness may decrease monotonically from the point of maximum blade thickness to the trailing edge. The maximum blade thickness may occur at 75% of the axial chord.

The discontinuity in the suction surface curvature may occur aft of 50% of the axial chord. The discontinuity in the suction surface curvature may occur at approximately 75% of axial chord. The discontinuity in the suction surface curvature may occur at, or immediately downstream of, the point of maximum blade thickness.

The discontinuity in curvature may be a finite discontinuity in curvature and may be caused by a discontinuity in one or more of the first, second or third derivatives of the suction surface profile. The first and second derivatives may be with respect to axial distance or may be with respect to another parameter, for example blade arc length. There may be a point of inflection at the discontinuity in curvature.

When in use, the discontinuity in curvature may be sufficient to cause a reduction in the Mach number at the boundary layer edge. The reduction in the Mach number may be a sharp reduction in the Mach number. The reduction in the Mach number may resemble a supersonic shock-wave, albeit for subsonic Mach numbers. In other words, the reduction may be a sudden and sharp drop in the Mach number over a short distance, which may appear as a "knee" in the boundary layer edge Mach number profile.

One or more internal passages may be disposed within the blade and the internal passages may be connected to the slot so as to provide a flow path within the blade for flow aspirated into the slot. The internal passages may be defined by passage walls and the passage walls may be adapted to guide the flow aspirated into the slot to the blade hub and/or tip.

The passage walls may define a substantially elliptical path for the flow inside the blade. The total area of outlets of the internal passages may be equal to or greater than the throat area of the slot.

According to a second aspect of the invention there is provided a turbomachine passage comprising a hub wall, a casing wall and a blade for a compressor, the blade comprising a pressure surface and a suction surface, wherein the suction surface comprises: a discontinuity in the chord-wise curvature of an intermediate portion of the suction surface between the blade leading edge and blade trailing edge; and a slot arranged along at least a portion of the blade in a substantially span-wise direction, the slot being disposed at or near the said discontinuity in the curvature, such that when in use, lower momentum fluid near the suction surface is aspirated into the slot, wherein the passage further comprises one or more end-wall slots in one or more of the hub wall and casing wall.

The one or more end-wall slots may be substantially parallel to the suction surface of the blade. Alternatively, the one or more end-wall slots may be substantially perpendicular to the rotational axis of the turbomachine.

According to a third aspect of the invention there is provided a turbomachine passage comprising a hub wall, a casing wall and a blade for a compressor, the blade comprising a pressure surface and a suction surface, wherein the suction surface comprises: a slot arranged along at least a portion of the blade in a substantially span-wise direction, wherein the passage further comprises one or more end-wall slots in one or more of the hub wall and casing wall.

The aforementioned features enable one or more of the following advantages: increased blade loading, increased flow turning for a given blade solidity, increased incidence range and hence an increase in compressor operating range, increased blade row efficiency, reduced solidity and hence wetted area, parts count and weight, reduced total-core or primary flow loss, reduced trailing-edge mixing loss, and low bleed mass flow rate and hence low system impact For a better understanding of the present invention, and to show more clearly how it may be carried into effect, reference will now be made, by way of example, to the accompanying drawings, in which:

A flow-controlled axial-compressor stator blade row is described herein. The principles involved, however, are also applicable to rotor blade design. Flow control in this case is achieved by boundary-layer suction, also known as aspiration, whereby low-momentum fluid is removed from one or more of the blade, hub and casing surfaces.

Figure 1:
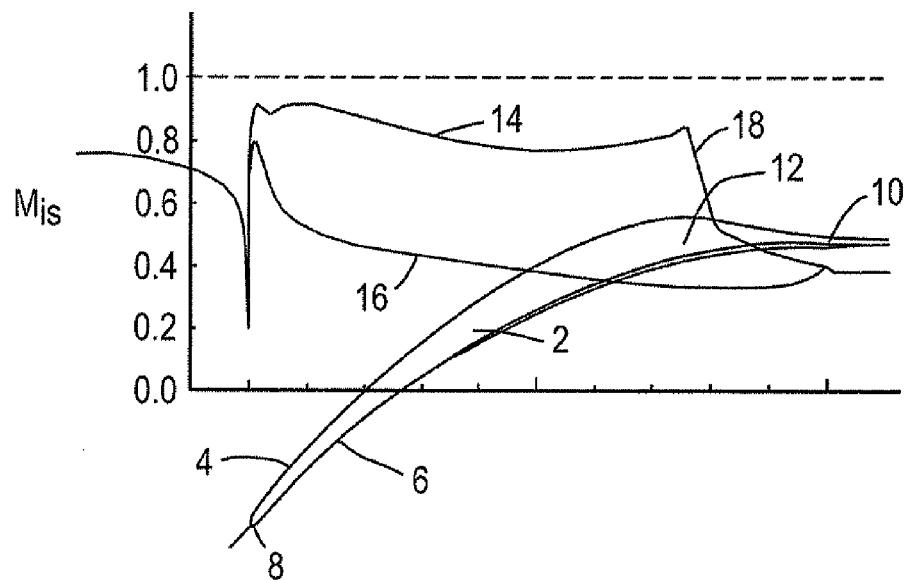
FIG. 1 shows a blade profile according to an embodiment of the present invention and FIG. 1 also shows the corresponding flow Mach numbers at the boundary layer edge on both the suction and pressure surfaces.

With reference to FIG. 1, a blade 2 according to an embodiment of the present invention comprises a suction surface 4 and a pressure surface 6. The blade 2 has a leading-edge 8 and a trailing-edge 10. The leading-edge 8 has a profile with a high initial curvature value at the leading-edge point that drops rapidly and continuously to approximately zero curvature on the suction and pressure surfaces 6, 8. The trailing-edge 10 has a substantially circular surface profile, although other trailing-edge profiles are possible, for example a blunt, square or sharp knife-edge profile.

The blade 2 has a monotonically increasing thickness distribution up to a maximum value located at approximately 0.75 of axial chord from the leading edge 8 (i.e. in the region denoted by 12 in FIG. 1). The thickness distribution of the blade 2 then monotonically decreases from this point to the trailing edge region.

An array of blades 2 are provided in an annular cascade to form a stator or rotor blade-row (not shown).

The blade-row is preferably adapted for a high subsonic inlet Mach number. As is shown in FIG. 1, the suction surface 4 is arranged such that an almost constant, high-subsonic boundary-layer edge Mach number 14 is maintained over the blade profile up to the region 12 of maximum blade thickness. Immediately downstream of the maximum blade thickness region 12, a change in the local suction surface curvature distribution in a span-wise direction is specified, such that a sharp reduction 18 or 'subsonic shock' in the suction surface boundary layer edge Mach number is attained, as shown in FIG. 1. The change in curvature of the suction surface is brought about by a finite discontinuity in one or more of the first, second and third derivatives. (The first, second and third derivatives may be with respect to axial distance or may be with respect to another parameter, for example blade arc length.)

Here, the 'subsonic shock' is a sudden change in Mach number over a short axial distance that resembles a supersonic shock, albeit for subsonic Mach numbers. In other words, the sharp reduction may be a sudden and sharp drop in the Mach number over a short distance, which may appear as a "knee" in the boundary layer edge Mach number profile.

In the particular example, shown in FIG. 1, the Mach number at the boundary layer edge drops by approximately 0.32 over a distance approximately 0.055 of the axial chord. These numbers are representative only and the reduction in the Mach number may be smaller or greater than that shown, as may the distance over which the reduction occurs. However, a large drop in the boundary layer edge Mach number is desirable.

The blade solidity is chosen such that the nominal exit flow angle of the blade-row is approximately attained by the time the blade-to-blade flow reaches the axial location of the 'subsonic shock'.

Figure 2:
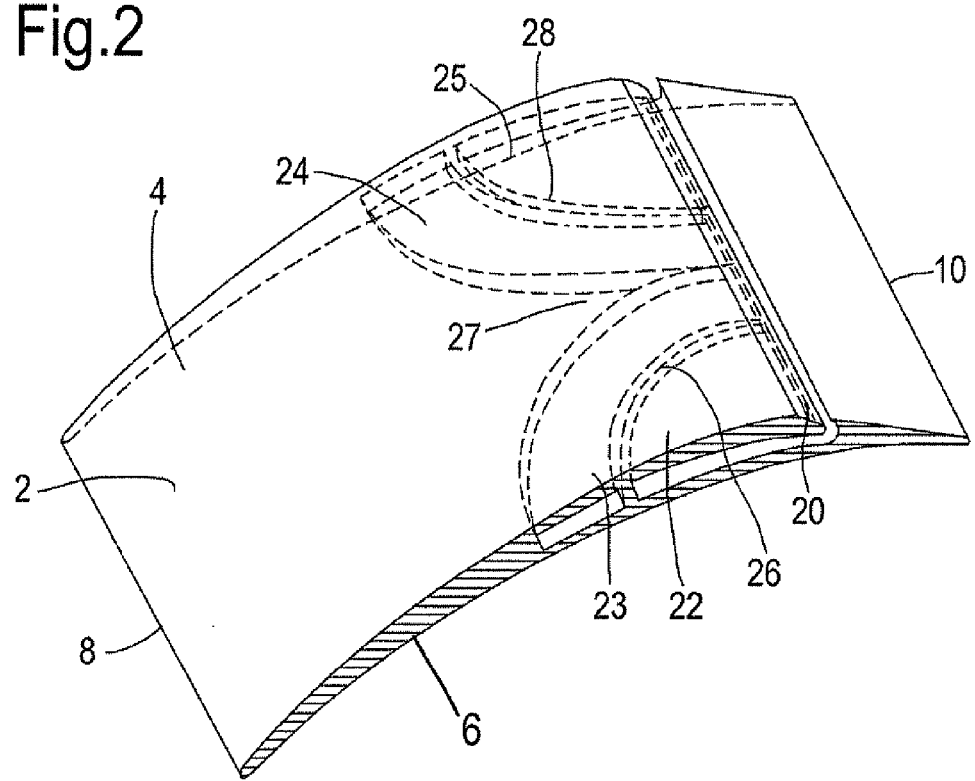
FIG. 2 shows a perspective view of a blade according to an embodiment of the present invention.

With reference to FIG. 2, at the point of the 'subsonic shock', an aspiration or bleed slot 20 is placed (i.e. immediately downstream of the maximum blade thickness region 12) and boundary-layer fluid is removed from the blade suction surface 4, to prevent premature flow separation due to the Mach number discontinuity. The bleed slot 20 and its relative geometric position on the blade 2 can be seen in FIG. 2.

The slot 20 may be positioned such that the 'subsonic-shock' sits just above the slot 20. In other words, the high point of the boundary layer edge Mach number just upstream of the 'subsonic shock' may occur over a line defining the opening of the slot 20, whilst the low point just downstream of the 'subsonic shock' may occur over the a line defining the closing of the slot 20. In addition, the slot 20 may occur at the point at which there is a discontinuity in the suction surface curvature such that the discontinuity occurs on an imaginary surface over the slot 20 (i.e. the surface which would have been present but for the slot). In other words there is a change in curvature between the opening of the slot 20 and the closing of the slot 20, which could not otherwise be attributed to a smooth transition in the surface curvature (i.e. there has been a discontinuity in the first, second or third derivatives at some point over the slot).

Downstream of the bleed slot 20, the local suction-surface profile tangent is set such that the flow deviation from the nominal exit flow angle is minimised.

According to the present invention, the peak curvature of the blade camber-line is placed aft, beyond 50% of the axial chord and in particular towards the blade trailing edge. This is in contrast to a previously-proposed prescribed-velocity-distribution blade, where the peak curvature of the camber-line is typically placed well forward, i.e. before the 50% axial chord point. By contrast, the camber-line curvature of the blades according to the present invention is virtually zero up to at least the 50% axial chord point. (As the camber-line is the mean line of the blade pressure and suction surface profiles and the pressure surface 6 does not exhibit a peak in curvature, the aforementioned location of the peak in curvature applies equally to both the suction surface 4 profile and the camber-line.)

The curvature distribution of the present invention allows the extreme aft 'subsonic shock' loading to be achieved, and also has a benefit at high subsonic Mach numbers at off-design conditions, as flow separation due to shock-boundary-layer interaction at off-design incidences is postponed.

The bleed slot 20 is a continuous opening across the span of the blade 2 and is located at or near where the suction surface 'subsonic shock' occurs. The bleed slot 20 has parallel walls and is inclined to form a ramped inlet through which the suction surface boundary-layer fluid is aspirated. Within the body of the blade 2, the bleed slot 20 curves back on itself to discharge the aspirated flow to a plenum located within the body of the blade 2.

The internal blade plenum is broken up into one or more chambers and in the embodiment shown in FIG. 2, four chambers 22-25 are provided. The chambers 22-25 are divided from one another by respective partition walls 26, 27 and 28. The partition walls 26-28 define elliptical chambers. The end-points of the ellipses do not extend through the bleed slot 20 to the blade suction surface 4, but terminate at a point just before the span-wise bleed slot 20 turns back on itself, as can be seen in FIG. 2. The partition walls are formed from elliptically shaped curves describing a smooth path for the aspirated fluid to flow along.

The divisions in the internal blade plenum are chosen such that a specific slot region and associated one or more chambers target the middle third of the blade span. In the particular embodiment shown in FIG. 2, the middle two chambers 23 and 24 target the middle third of the blade span. This arrangement ensures that an even aspiration rate is maintained across the blade span. The internal blade chambers 22-25 discharge the aspirated flow from the interior of the blade to the hub and/or casing end-walls. Furthermore, the cross-sectional areas of the chamber exits are chosen to be equal to or greater than the throat area of the bleed slot 20.

An advantage of the present invention is that it enables a more rectangular pressure (or indeed Mach number) profile over the blade suction surface, as is shown in FIG. 1. This rectangular profile allows greater loading on the blade to be achieved, which is in contrast to conventional compressor blades which have a more triangular pressure profile with the peak Mach number closest to the leading edge. The loading on the blade is linked to the integral of the pressure profile and a more rectangular profile enables a greater load to be achieved. Alternatively (or in addition), the peak Mach number on the suction surface with the present invention may be less than that for a conventional blade, which reduces the chance of undesirable shock wave boundary layer interactions.

These advantages are made possible by the 'subsonic shock', which in effect localises the pressure recovery and enables the aforementioned rectangular profile. This in turn enables a higher loading and/or more turning.

Furthermore, the 'subsonic shock' in isolation would be likely to trigger a flow separation, which is undesirable for a compressor blade. However, the presence of the slot at, or near, the point at which the 'subsonic shock' occurs prevents this flow separation from happening. In addition, further advantages are brought about by the new boundary layer, which starts downstream of the slot, as this fresh boundary layer is thinner than it would be without the slot. A thinner boundary layer exhibits less drag and is less likely to separate.

Overall, by removing the low-momentum blade boundary layer fluid that limits flow diffusion, significant increases in loading and hence flow turning are possible. The position of the bleed slot 20 and the presence of the 'sub-sonic shock' allows a reduction of the flow into the bleed slot 20, thereby providing the advantages of an aspirated blade, whilst mitigating against the overall efficiency loss.

Figure 3:
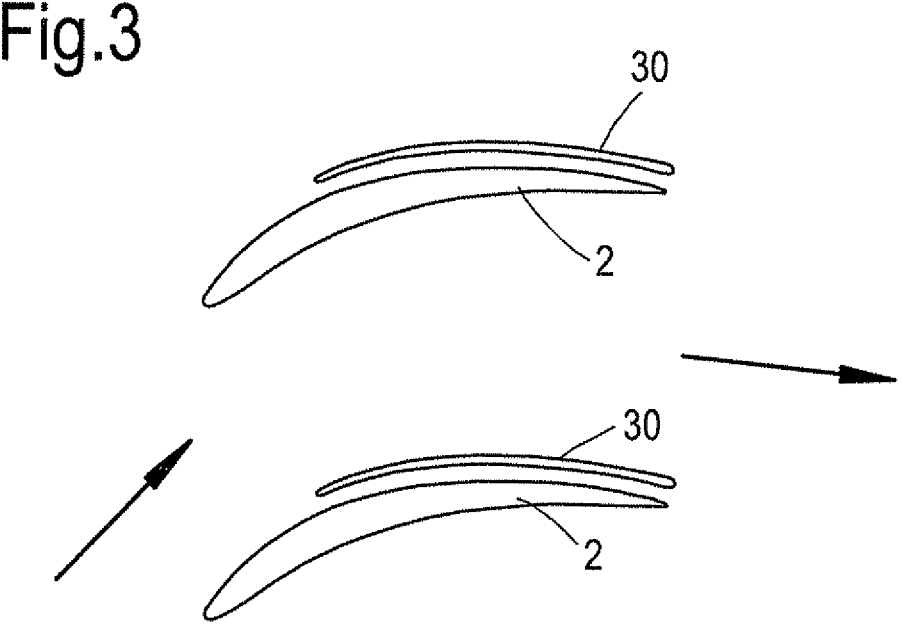
FIG. 3 shows a plan view of a blade row with end-wall slots according to a first example of the present invention.

With reference to FIG. 3, end-wall bleed slots 30 according to a first configuration are provided in one or more of the hub and casing end-walls within the blade passage. (NB, the blade profiles shown in FIG. 3 are different from those shown in FIGS. 1 and 2.) The end-wall bleed slots 30 are approximately 2.5% of the true blade chord in width. The end-wall bleed slots 30 run approximately 2.5% of the true blade chord above the blade suction surface 4 along the hub and/or casing end-wall, such that the end-wall bleed slots 30 follow the suction surface 4 over a substantial portion of the blade profile. In particular, the length of the slot may be from the suction-surface pressure peak to the suction surface trailing edge 10.

Figure 4:
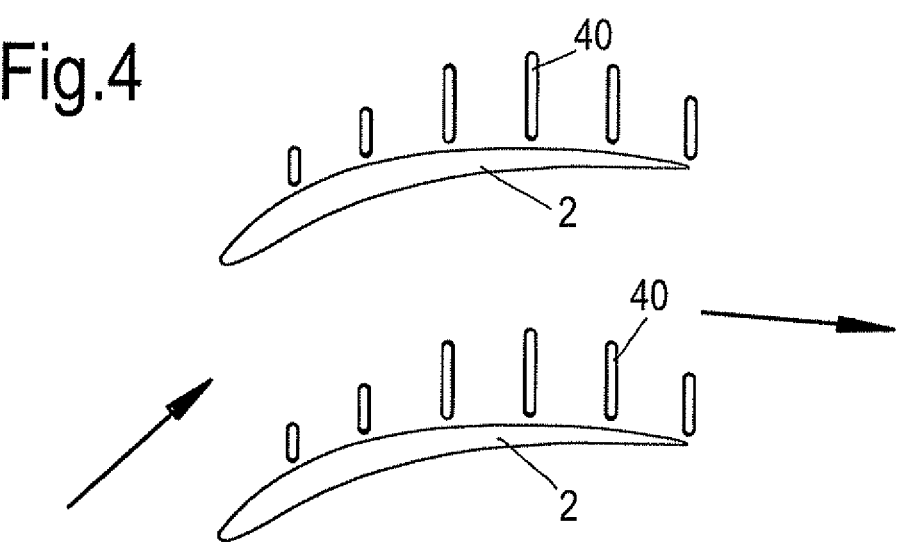
FIG. 4 shows a plan view of a blade row with end-wall slots according to a second example of the present invention.

With reference to FIG. 4, end-wall bleed slots 40 according to a second configuration are provided in one or more of the hub and casing end-walls within the blade passage. (NB, the blade profiles shown in FIG. 4 are different from those shown in FIGS. 1 and 2.) The end-wall bleed slots 40 comprise one or more circumferential slots that extend from a point near or at the interface between the blade suction surface 4 and the hub or casing end-wall. The end-wall bleed slots 40 can have varying circumferential lengths, but for simplicity can be arranged with an approximately constant length of typically 20% of the blade pitch. A number of the end-wall bleed slots 40, for example 5 to 10, are spaced equally along the hub and/or casing end-wall, beginning at the blade suction surface pressure peak and are distributed along the end-wall up to the suction surface trailing edge 10.

The end-wall bleed slots 30, 40 are used to militate against the adverse effects of the over-turning end-wall boundary layer. By removing the end-wall boundary layer, the end-wall corner separations that result in significant entropy generation and blockage can be reduced or eliminated.

If the amount of bleed mass flow used to affect control of the flow is small, the system impact of this control is expected to be small and may even be positive. The benefits of a successful flow-control application to axial-compressor design are therefore significant, yielding more compact axial-compressor designs with higher efficiency and reduced parts-count and weight, with a favourable impact on engine cycle performance.

According to the present invention, the manner in which flow diffusion is achieved via a subsonic shock and the application of aspiration control to the blade profile provides a new type of ultra-highly loaded, low-loss stator/rotor blade with low blade solidity. In addition, the end-wall slots and the resulting end-wall aspiration separately from, or in conjunction with, the blade slots, provide an ultra-highly loaded, low-loss stator/rotor blade concept.

The invention claimed is:

1. A blade for a compressor comprising a pressure surface and a suction surface, wherein the suction surface comprises:
   a discontinuity in the chord-wise curvature of an intermediate portion of the suction surface between the blade leading edge and blade trailing edge; and
   a slot arranged along at least a portion of the blade in a substantially span-wise direction, the slot being disposed at or near the discontinuity in the curvature, such that when in use, lower momentum fluid near the suction surface is aspirated into the slot, wherein the discontinuity is either on the suction surface or on an imaginary continuation of the suction surface between an opening of the slot and a closing of the slot, such that the discontinuity is independent of the slot geometry.

2. A blade according to claim 1, wherein the blade thickness increases monotonically from the leading edge to a point of maximum blade thickness.

3. A blade according to claim 2, wherein the discontinuity in curvature occurs at, or immediately downstream of, the point of maximum blade thickness.

4. A blade according to claim 1, wherein the blade thickness decreases monotonically from a point of maximum blade thickness to the trailing edge.

5. A blade according to claim 1, wherein the maximum blade thickness occurs at 75% of the axial chord.

6. A blade according to claim 1, wherein the discontinuity in the suction surface curvature occurs aft of 50% of the axial chord.

7. A blade according to claim 1, wherein the discontinuity in the suction surface curvature occurs at approximately 75% of axial chord.

8. A blade according to claim 1, wherein the discontinuity in curvature is caused by a discontinuity in one or more of the first and second derivatives of the suction surface profile.

9. A blade according to claim 1, wherein, when in use, the discontinuity in curvature is sufficient to cause a reduction in the Mach number at the boundary layer edge.

10. A blade according to claim 1, wherein one or more internal passages are disposed within the blade, the internal passages being connected to the slot so as to provide a flow path within the blade for flow aspirated into the slot.

11. A blade according to claim 10, wherein the internal passages are defined by passage walls, the passage walls being adapted to guide the flow aspirated into the slot to the blade hub and/or tip.

12. A blade according to claim 10, wherein the total area of outlets of the internal passages is equal to or greater than the throat area of the slot.

13. A turbomachine passage comprising a hub wall, a casing wall and the blade of claim 1, wherein the passage further comprises one or more end-wall slots in one or more of the hub wall and casing wall.

14. A turbomachine passage as claimed in claim 13, wherein the one or more end-wall slots are substantially parallel to the suction surface of the blade.

15. A turbomachine having a blade as claimed in claim 1.

16. A blade according to claim 1, wherein an opening of the slot is upstream of a closing of the slot.

* * * * *